Oct. 22, 1968  J. PICKLES  3,406,795
SEAT ADJUSTER CONTROL MECHANISM
Filed Sept. 8, 1966
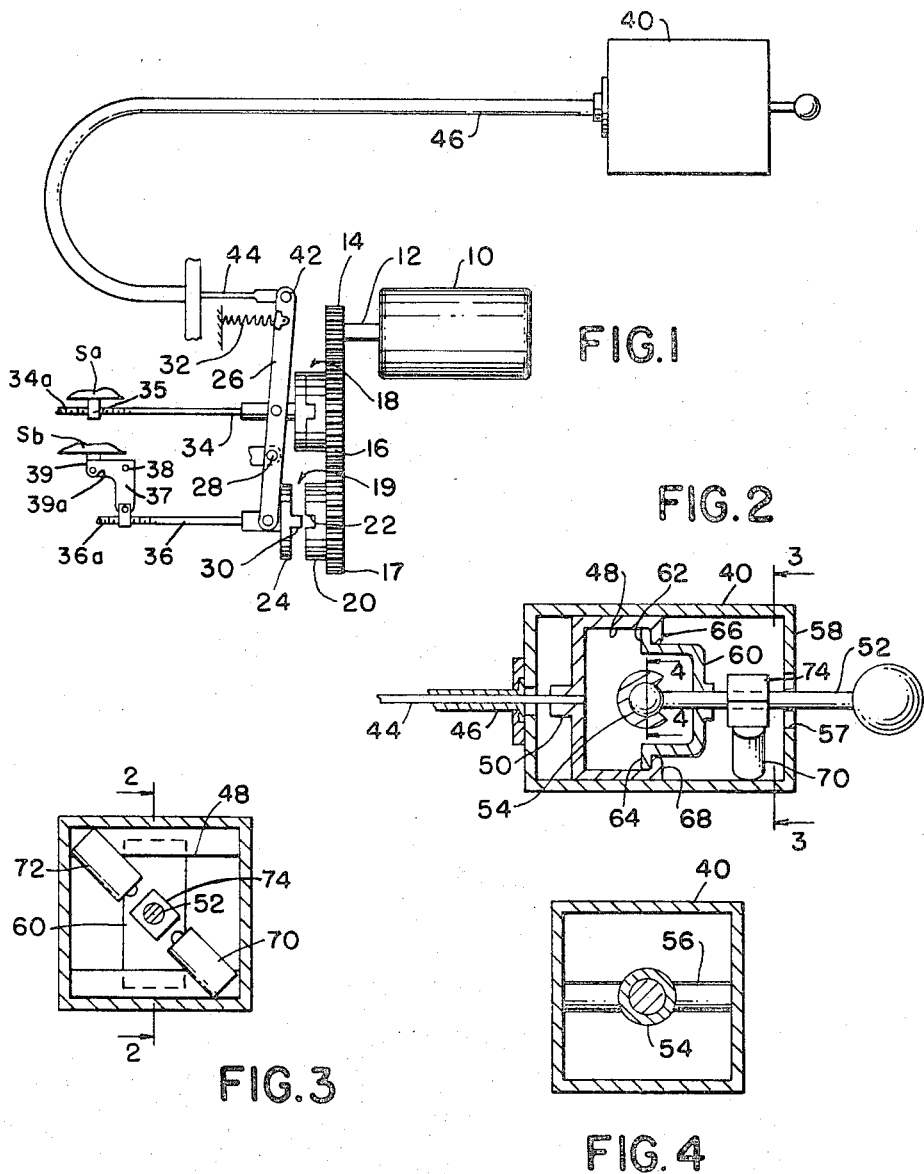
INVENTOR
JOSEPH PICKLES
BY Whittemore,
Hulbert & Belknap ATTORNEY

United States Patent Office 3,406,795
Patented Oct. 22, 1968

3,406,795
SEAT ADJUSTER CONTROL MECHANISM
Joseph Pickles, Dearborn, Mich., assignor to Ferro Manufacturing Corporation, Detroit, Mich., a corporation of Michigan
Filed Sept. 8, 1966, Ser. No. 578,070
10 Claims. (Cl. 192—.02)

ABSTRACT OF THE DISCLOSURE

Seat adjuster control mechanism including two clutches for alternate engagement, a single motor, two motor control switches for energizing the motor for forward or reverse rotation, and a control device including a single lever movable selectively from an intermediate neutral position in opposite senses in two different directions. Movement of the lever in opposite senses in one direction leaves a first clutch engaged and simultaneously energizes the motor for forward or reverse rotation. Movement of the lever in opposite senses in the other direction disengages the first clutch and engages a second clutch, and simultaneously energizes the motor for forward or reverse rotation.

---

It is an object of the present invention to provide control mechanism including combined switch and clutch actuating means for effecting selective clutch actuation and forward or reverse energization of a motor to cause a vehicle seat to move either forwardly, rearwardly, upwardly or downwardly.

It is a further object of the present invention to provide manual seat control mechanism including a movable control element movable upwardly to effect upward seat adjustment, downwardly to effect downward seat adjustment, forwardly to effect forward seat adjustment, and rearwardly to effect rearward seat adjustment.

It is a further object of the present invention to provide combined clutch and switch actuating mechanism including a single element movable in either of two opposite directions to effect like clutch operation and to effect selective switch actuation to energize an electric motor for forward or reverse operation and operable in two different opposite directions to effect selective energization of the electric motor in forward or reverse direction without affecting clutch operation.

Other objects and features of the invention will become apparent as the description proceeds, especially when taken in conjunction with the accompanying drawing, illustrating a preferred embodiment of the invention, wherein:

FIGURE 1 is a diagrammatic view of the switch operator showing connections to a clutch.

FIGURE 2 is a sectional view through the control mechanism, taken substantially on the line 2—2, FIGURE 3.

FIGURE 3 is a sectional view on the line 3—3, FIGURE 2.

FIGURE 4 is a fragmentary sectional view on the line 4—4, FIGURE 2.

Referring now to the figures, the present invention is intended for effecting selective operation of an adjustable vehicle seat of the type commonly referred to as a four-way seat. A seat of this type may be automatically adjusted by the operator horizontally in a forward or rearward direction, and vertically upwardly or downwardly.

The actual mechanism for effecting movement of the seat is not illustrated in detail, but in FIGURE 1 there is shown an electric motor 10 having an output shaft 12 connected to a drive pinion 14 which is in mesh with a gear 16, the gear 16 being in mesh with a gear 17. The gears 16 and 17 have clutches 18 and 19 respectively associated therewith. Each of the clutches 18 and 19 includes a clutch element or plate 20 diagrammatically indicated has having a transverse groove 22 therein. The cooperating clutch elements 24 are carried by an arm 26 pivoted on a stationary pivot mounting indicated at 28. Each of the clutch plates 24 is diagrammatically illustrated as having a tenon or rib 30 adapted to be received in the groove 22 when the clutch elements are brought into juxtaposition, a condition indicated between the upper clutch elements 20 and 24. Resilient means 32, herein illustrated as a compression spring, are provided biasing the arm 26 into the illustrated position causing the clutch 18 to be engaged and the clutch 19 to be disengaged. Obviously, at this time rotation of the gear 16 will be transmitted to an output shaft 34 while the output shaft 36, connected to the cluch plate 24 of the lower clutch 19, will not roate. It will be understood that each of the shafts 34 and 36 is connected to the horizontal seat adjusting mechanism, or the vertical seat adjusting mechanism respectively.

Shaft 34 has a threaded portion 34a engaged in a nut 35 affixed to horizontally movable seat support structure, a portion of which is seen at Sa. Shaft 36 has a threaded portion 36a threaded in a nut carried by bell crank 37, mounted to a pivot support at 38, and having an arm 39 connected at 39a to vertically movable seat support structure, a portion of which is seen at Sb.

The means for selectively energizing the electric motor 10 for forward or reverse direction and for controlling the engagement and disengagement of the clutches 18 and 19 comprise the mechanism included in a housing 40 and best illustrated in FIGURES 2, 3 and 4.

The upper end of the arm 26 is connected as indicated at 42 to a Bowden wire 44 extending through a flexible tubular housing 46 and is adapted when the wire is moved to the left as seen in FIGURE 1, to disengage the clutch 18 and to engage the clutch 19.

Operation of the Bowden wire 44, as best seen in FIGURE 2, is brought about by movement to the right of a slide 48 mounted for movement in the housing 40 and connected as indicated at 50 to the Bowden wire. Movement of the slide 48 is accomplished by means of the control lever 52 which is pivoted for universal movement by means of a ball and socket connection 54, the socket being formed in or carried by a transverse strut 56 as best seen in FIGURE 4. With this arrangement, the lever 52 may be moved vertically or horizontally and preferably, its movement is restricted to these directions by means of a suitable cross-shaped opening 57 provided in the front wall 58 of the housing. Rigidly connected to the lever 52 is a cam element 60 having a pair of pins 62 and 64 which engage the inner surface of ears 66 and 68 provided on the slide 48. With the parts in the position shown in FIGURE 6 it will be observed that upward movement of the lever 52 will cause the lower pin 64 to move the slide to the right as the upper pin 62 moves away from the ear 66. Conversely, downwardly movement of the lever 52 from the illustrated position will cause the pin 62 to move the slide 48 to the right through its engagement with the ear 66 while the pin 64 moves away from the ear 68. Accordingly, on vertical upward or downward movement of the lever 52 the clutch 18 will be disengaged and the clutch 19 will be engaged.

Conveniently, this movement of the lever may be by suitable connections effective to energize the motor 10 and to connect it to the shaft 36 which will accordingly be connected to the vertical seat adjustment mechanism. Moreover, it is preferred that upward movement of the lever 52 will effect upward adjustment of the seat, and vice-versa.

When the lever 52 is moved horizontally it will be observed that the pins 62 and 64, which are coaxial with the universal pivot mounting 54, will not cause any movement of the slide 48, which accordingly will remain in the position illustration in FIGURE 1, so that energization of the motor 10 will effect rotation of the shaft 34 which will accordingly be connected to the horizontal seat adjusting mechanism. Again, it will be desirable for forward movement of the lever 52 to effect forward adjustment of the seat and vice-versa.

In order that movement of the lever 52 to any one of the four operating positions permitted by the cruciform opening 57 will effect proper energization of the motor 10, two switches 70 and 72 are provided. The lever 52 is provided with a switch operating block 74. From FIGURE 3 it will be observed that vertically upward movement of the lever 52 or horizontal movement of the lever 52 to the left will operate the switch 72. Similarly, downward movement of the lever 52 or movement thereof to the right as seen in FIGURE 3, will result in operation of the switch 70. One of the switches 70 and 72 is effective to energize the motor 10 for rotation in one direction and operation of the other switch will result in energization of the motor in the opposite direction.

It will be apparent that the operating lever is movable in a vertical direction, either upwardly or downwardly, and this movement may properly be referred to as movement in opposite senses in a single direction, the direction of course being vertical and the senses being upwardly or downwardly. Similarly, the lever is movable in a horizontal direction, either to the right or left, or from front to back as the case may be. In this case this movement of the lever may also be described as movement in opposite senses in a single direction different from the first mentioned direction. In this case the direction of course in the appropriate horizontal direction and the opposite senses are in this direction either from front to back or from right to left as the case may be.

The drawing and the foregoing specification constitute a description of the improved seat adjuster control mechanism in such full, clear, concise and exact terms as to enable any person skilled in the art to practice the invention, the scope of which is indicated by the appended claims.

What I claim as my invention is:

1. A control device for selecting one of four possible combinations of clutch condition and direction of motor energization comprising an operating element movable in opposite sense in two different directions from a neutral position, a forward switch for effecting forward motor energization operable by said element upon movement of said element in one sense in two different directions, a reverse switch for effecting reverse motor energization operable by said element upon movement of sadi element in opposite sense in the two different directions, and clutch operating cam means operable in the same sense upon movement of said element in either sense in only one of said directions.

2. A device as defined in claim 1 in which said element is a lever, and means mounting said lever for vertical and horizontal movement.

3. A control device for selecting one of four possible combinations of clutch condition and direction of motor energization comprising an operating element movable in opposite sense in two different directions from a neutral position, a forward switch for effecting forward motor energization operable by said element upon movement of said element in one sense in two different directions, a reverse switch for effecting reverse motor energization operable by said element upon movement of said element in opposite sense in the two different directions, and clutch operating cam means operable in the same sense upon movement of said element in either sense in only one of said directions, said clutch operating cam means comprising a pair of arms on said lever, and a slide engageable by one or the other of said arms upon rocking of said lever in opposite sense in one direction.

4. A device as defined in claim 3, said arms including slide operating portions concentric with an axis through said mounting means whereby rocking of said lever in either sense about said axis will not move said slide.

5. In combination, a reversible electric motor, a pair of clutches each including a driving clutch element driven in rotation by said motor and a driven clutch element, means interconnecting said clutches operable to maintain either of said clutches engaged while the other is disengaged, movable clutch actuating means connected to said clutches including a member having two positions one of which corresponds to engagement to one clutch and the other of which corresponds to engagement of the other clutch, an operating lever movable in opposite sense in a vertical plane or opposite sense in a horizontal plane, from an intermediate neutral position, cam means interposed between said lever and said member and operable to move said member from one of its two positions to the other upon movement of said lever in either sense in one of said planes and to leave said member in its said one position upon movement of said lever in either sense in the other of said planes, forward and reversing switches connected to said motor, and switch operating means movable by said lever upon movement of said lever in one sense in either of said two planes to actuate one of said switches and to actuate the other of said switches upon movement of said lever in the opposite sense in either of said two planes.

6. The combination defined in claim 5 in which the clutch actuating means comprises a Bowden wire connected to said member.

7. The combination defined in claim 5 in which said clutches selectively connect said motor to vertically or horizontally acting seat adjustment mechanism, said lever being movable upwardly to move a seat actuated by said mechanism upwardly, movable downwardly to move the seat downwardly, and movable forwardly or rearwardly to move the seat respectively forwardly or rearwardly.

8. A combined clutch and switch operator comprising a housing, a slide in said housing, a lever pivoted within said housing and having actuating arms engaging said slide and operable to move said slide in the same direction upon opposite movement of said lever in a first plane from an intermediate position, said arms extending generally radially of the pivot mounting of said lever whereby movement of said lever in a plane normal to the first plane does not move said slide.

9. An operator as defined in claim 8 in which said slide is operatively connected to a movable clutch operating member by a Bowden wire device.

10. An operator as defined in claim 8, a pair of switches having switch operating means in the path of movement of said lever, one of said switch operating means being positioned to be engaged by movement of said lever in one direction in both of said planes, the other of said switch operating means being positioned to be engaged by movement of said lever in the opposite direction in both of said planes.

References Cited

UNITED STATES PATENTS

| 1,146,872 | 7/1915 | Hartford | 192—.02 |
| 2,204,265 | 6/1940 | Wentzel | 192—.07 |
| 2,930,428 | 3/1960 | De Rose | 297—347 |
| 3,123,333 | 3/1964 | De Rose | 248—394 |
| 3,125,318 | 3/1964 | Lohr et al. | 248—419 |

MARTIN P. SCHWADRON, *Primary Examiner.*

C. LEEDOM, *Assistant Examiner.*